United States Patent [19]
Holden et al.

[11] Patent Number: 5,421,147
[45] Date of Patent: Jun. 6, 1995

[54] NUT HARVESTER

[75] Inventors: Gary R. Holden, Manteca; Delbert L. Williams, Valley Springs; Lloyd F. Hay, Oakdale, all of Calif.

[73] Assignee: FR Mfg. Corporation, Stockton, Calif.

[21] Appl. No.: 99,120

[22] Filed: Jul. 29, 1993

[51] Int. Cl.⁶ ............................................ A01D 51/00
[52] U.S. Cl. .................... 56/328.1; 56/12.8; 56/16.5; 209/139.2
[58] Field of Search .................. 56/12.8, 328.1; 209/139.2, 140, 141, 143, 148

[56] References Cited

U.S. PATENT DOCUMENTS

| | | |
|---|---|---|
| 2,502,810 | 4/1950 | Waters . |
| 2,679,133 | 5/1954 | Soderholm . |
| 2,780,904 | 2/1957 | Bowie et al. . |
| 2,781,625 | 2/1957 | Phelps et al. . |
| 3,407,581 | 10/1968 | Wild . |
| 3,520,123 | 7/1970 | Patterson . |
| 3,714,768 | 2/1973 | Patterson . |
| 4,251,356 | 2/1981 | Harte ................................ 209/143 |
| 4,535,894 | 8/1985 | Shell . |
| 4,550,465 | 11/1985 | Chrisley ............................ 56/328.1 |
| 4,642,977 | 2/1987 | Ramacher ........................ 56/328.1 |

Primary Examiner—Ramon S. Britts
Assistant Examiner—Pamela A. O'Connor
Attorney, Agent, or Firm—Wood, Herron & Evans

[57] ABSTRACT

A nut harvester includes a frame drawn by a tractor over nut and debris windrows on the ground of a nut orchard. The nut harvester collects the nuts from the windrows and separates the debris collected therewith while minimizing the dust emissions and airborne pollutants generated by the nut harvester. The nut harvester includes three primary sections: a pick-up section, a stationary grid section, and a conveyor/fan section. The pick-up section includes finger assemblies which engage the ground to propel the nuts and debris forwardly and upwardly into a rotating feed reel which in turn deposits the nuts onto a stationary grid. The stationary grid includes a number of parallel bars which are spaced to prevent the nuts from falling therebetween. Wipers extend transversely across the grid and advance the nuts therealong. The wipers include downwardly projecting teeth which are inserted between the bars to separate dirt clumps, sand-like soil and other debris for return directly to the ground, thereby minimizing dust emissions. The nuts and debris are then deposited onto a perforate conveyor through which an air stream created by a centrifugal fan separates the remaining debris from the nuts. The air stream and entrained debris are directed to a fan housing to circulate therein with the centrifugal fan. The heavier debris is partitioned off from the lighter debris and enters a scoop section due to the variation in centrifugal force associated with each portion of the debris. Heavier debris is returned directly to the ground through an air-lock at the terminal end of the scoop section; whereas, the lighter debris is discharged to the atmosphere with the air stream. As a result, the nut harvester deposits both the dirt and heavier debris directly to the ground thereby minimizing the dust emissions and airborne pollutants created in the harvesting process.

30 Claims, 5 Drawing Sheets

NUT HARVESTER

BACKGROUND OF THE INVENTION

This invention relates generally to harvesters for collecting nuts, fruits, olives and other articles gathered directly from the ground or other prepared surface (hereafter collectively referred to as "nuts") and thereafter separating unwanted debris such as leaves, twigs, grass and dirt from the harvested nuts. More particularly, this invention is directed, but not limited, to a nut harvester which effectively and efficiently separates the nuts from the debris while reducing the airborne pollutants and emissions associated with previous nut harvesters.

The modern nut harvester performs the dual job of first collecting the windrows of nuts and intermixed debris, and then separating the nuts from the debris. The effective separation of the collected nuts from the associated debris has been the focus of many prior nut harvesting machines. One prior method to separate the intermingled nuts and debris is to pass the debris and nuts through an air stream.

Separation mechanisms which utilize an air stream passing transversely through a perforated conveyor to uplift and remove the lighter and more aerodynamically responsive trash material from the nuts are well known in the art. This conventional method often includes a centrifugal fan sufficiently powerful to create an air stream passing through a portion of a foraminous conveyor. The debris is thereby separated from the relatively heavy nuts and carried upwardly from the conveyor to be eventually discharged to the atmosphere.

In order to improve the effectiveness of the separation of the nuts from the debris, many nut harvesters include multiple or more powerful fans to thereby generate an increased airflow rate. However, the problem associated with using an air stream to separate the debris from the collected nuts are the emissions and airborne pollutants which are discharged from the nut harvester to the atmosphere. Specifically, clumps of dirt are frequently collected by the nut harvester with the nuts. The dirt clumps are broken down within the air stream and are discharged as dust thereby creating significant dust emissions during the nut harvest.

Therefore, a need exists for a nut harvester which efficiently and effectively collects the nuts from windrows on the ground and separates the collected debris from the nuts while reducing the discharge of dust emissions and airborne pollutants associated with prior nut harvesters. The need for such a nut harvester is highlighted by the existing and anticipated restrictions on dust and airborne pollution within the nut harvesting industry.

SUMMARY OF THE INVENTION

The nut harvester embodied in this invention includes a number of features specifically directed toward reducing the dust emissions and airborne pollutants generated during the harvesting of nuts and the separation of the debris collected therewith. Additionally, this invention accomplishes emission reduction while providing a more reliable and cost effective debris separation apparatus.

The first feature of the nut harvester of this invention which reduces dust emissions is a stationary grid primarily designed for the removal of dirt clumps and any sand-like soil from the collected nuts and debris. The nuts and debris are deposited onto the stationary grid after being collected from the ground. The stationary grid includes a number of spaced parallel bars extending longitudinally in the nut harvester. The spacing between the bars is sized to prevent the nuts from falling between the bars and through the grid. The grid is inclined with respect to the ground such that a leading end of the grid is lower than the trailing end of the grid.

The nuts and debris are advanced from the leading to the trailing end of the grid by a number of wipers extending transversely on the grid and moving in a generally oval path, an upper portion of which coincides with the grid. Each wiper includes a number of metallic teeth which project between the bars and into the grid thereby forcing the dirt, but not the nuts, through the grid. The teeth advantageously project between the parallel bars to enhance the removal of the dirt and sand-like soil from the collected nuts. The dirt falls between the spaced bars and returns to the ground therebelow without producing the significant dust emissions associated with fans and air streams commonly used to remove dirt from the collected nuts and debris.

Additionally, in that the grid is stationary, the expensive conveyer chain used to move the grids of other nut harvesters is not required. A simple chain link attached to rotationally driven pulleys at the leading and trailing end of the grid moves the wipers across the grid thereby eliminating the expensive and difficult to repair conveyor chain required with moving grids.

The second feature of the nut harvester of this invention which reduces emissions is a centrifugal fan in conjunction with a scoop for sectioning off the heavier debris entrained in an air stream generated by the fan. The nuts and remaining debris are deposited from the grid onto a perforate conveyor. The conveyor also moves longitudinally with respect to the nut harvester from a leading end to a trailing end of the conveyor. As the nuts and remaining debris travel on the perforate conveyor, they pass through an upwardly directed air stream generated by the suction of a centrifugal fan positioned laterally on the nut harvester. As with other nut harvesters which employ a centrifugal fan, the heavier nuts continue to travel on the conveyor past the air stream while the remaining debris becomes entrained in the air stream and carried upwardly away from the nuts.

The air stream carries the debris to a generally circular fan housing in which the centrifugal fan rotates, thereby circulating the debris within the fan housing. The heavier debris, such as twigs and large leaves, moves to the outer periphery of the fan adjacent the fan housing due to the centrifugal force associated with its rotation. However, the lighter debris, such as grasses and smaller leaves, rotates within the fan housing toward the inner or central regions of the fan and fan housing because of its comparatively less mass and consequentially less centrifugal force.

Formed within a portion of the fan housing is a scoop section which partitions off the heavier debris at the outer peripheral regions of the air stream within the fan housing. An eddy-current of air is created in the scoop section because an air-lock is positioned at the terminal end of the scoop section thereby creating an airflow differential between the scoop section and the fan housing. The eddy-current assists in the partitioning off of the heavier debris from the air stream within the fan housing. The air-lock consists of a plurality of radially extending air-lock blades which rotate to sequentially seal off the scoop section and minimize the airflow therein. The rotation of the air-lock blades pushes out the heavier debris deposited in the scoop section for discharge to the ground below. The heavier debris is discharged from the nut harvester with minimal air current thereby minimizing emissions and other airborne pollutants. The lighter debris is directed to a discharge conduit to exit the nut harvester and return to the atmosphere.

The above features and advantages of this invention will be better understood in reference to the accompanying figures and detailed description. It should be understood that the particular specifications, configurations, or geometrical relationships of the nut harvester are exemplary only and are not to be regarded as limitations on the invention.

BRIEF DESCRIPTION OF THE DRAWINGS

Reference is now made to the accompanying drawings from which the novel features and advantages of the present invention will be apparent.

DETAILED DESCRIPTION OF THE INVENTION

A nut harvester 10 of this invention is designed for picking up and separating a mixture of nuts and accompanying debris which had been by previous operations, deposited and accumulated on the ground. The nuts and debris typically have been gathered together in relatively long, often wide and high windrows between the rows of trees. The nut harvester 10 may be self-propelled, but in many instances, it is advanced between the tree rows and over the ground by a standard tractor (not shown). The operator typically directs the harvester 10 into fore and aft longitudinal alignment with the previously formed windrow of nuts and debris to initiate the harvesting process. A windrow (not shown) of a mixture of nuts and debris, including leaves, twigs, grass and dirt clods, is traversed by a tractor.

Figure 1:
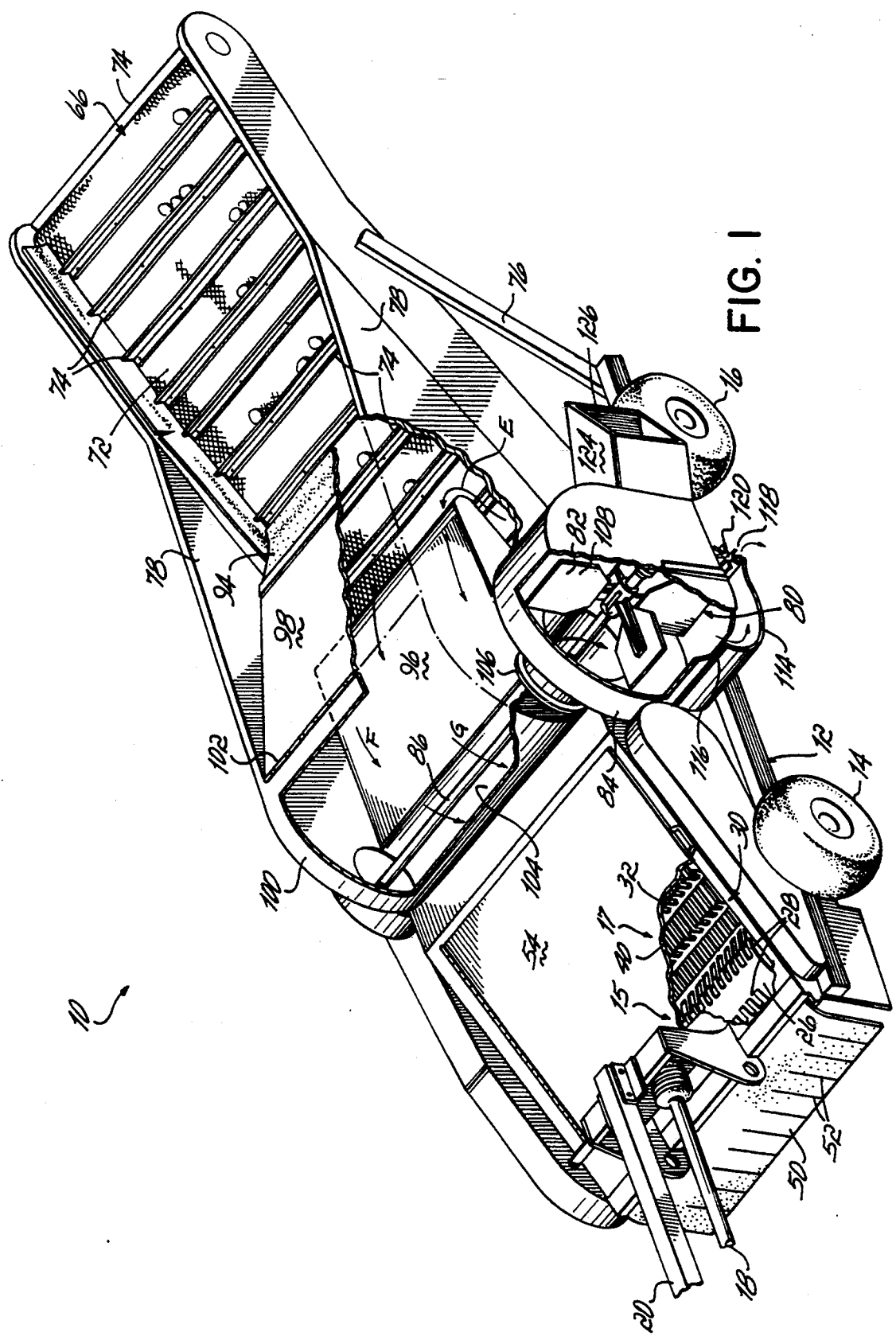
FIG. 1 is a perspective partially sectioned view of a nut harvester of this invention.

The harvester 10, as shown in FIG. 1, includes a mainframe 12 supported at a front end by ground engaging, preferably pneumatic, wheels 14, and similar rear ground engaging wheels 16. The nut harvester 10 is coupled to the tractor by a power take-off 18 and a hitch 20.

Figure 2:
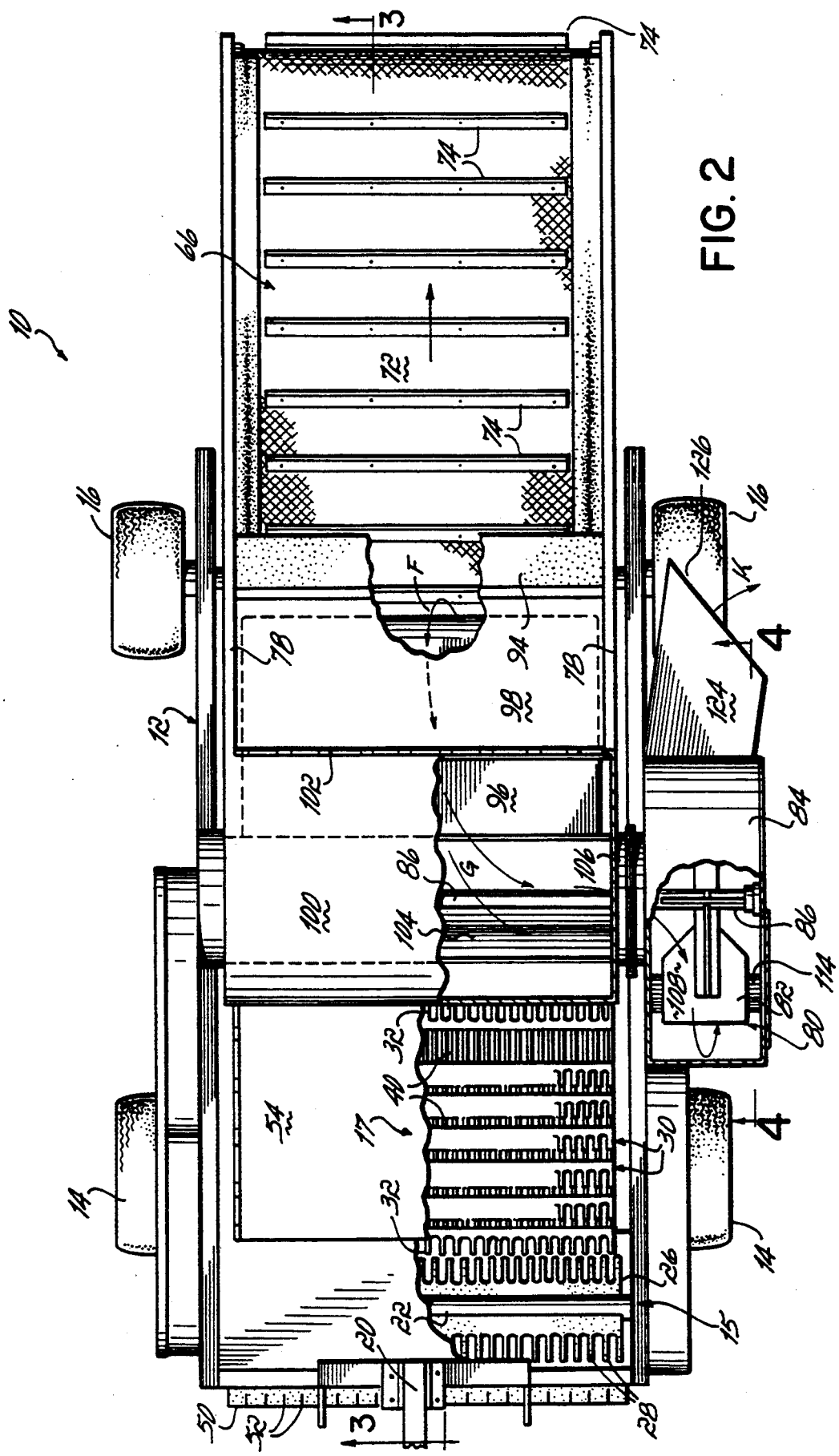
FIG. 2 is a top partially sectioned elevational view of the nut harvester of FIG. 1.
Figure 3:
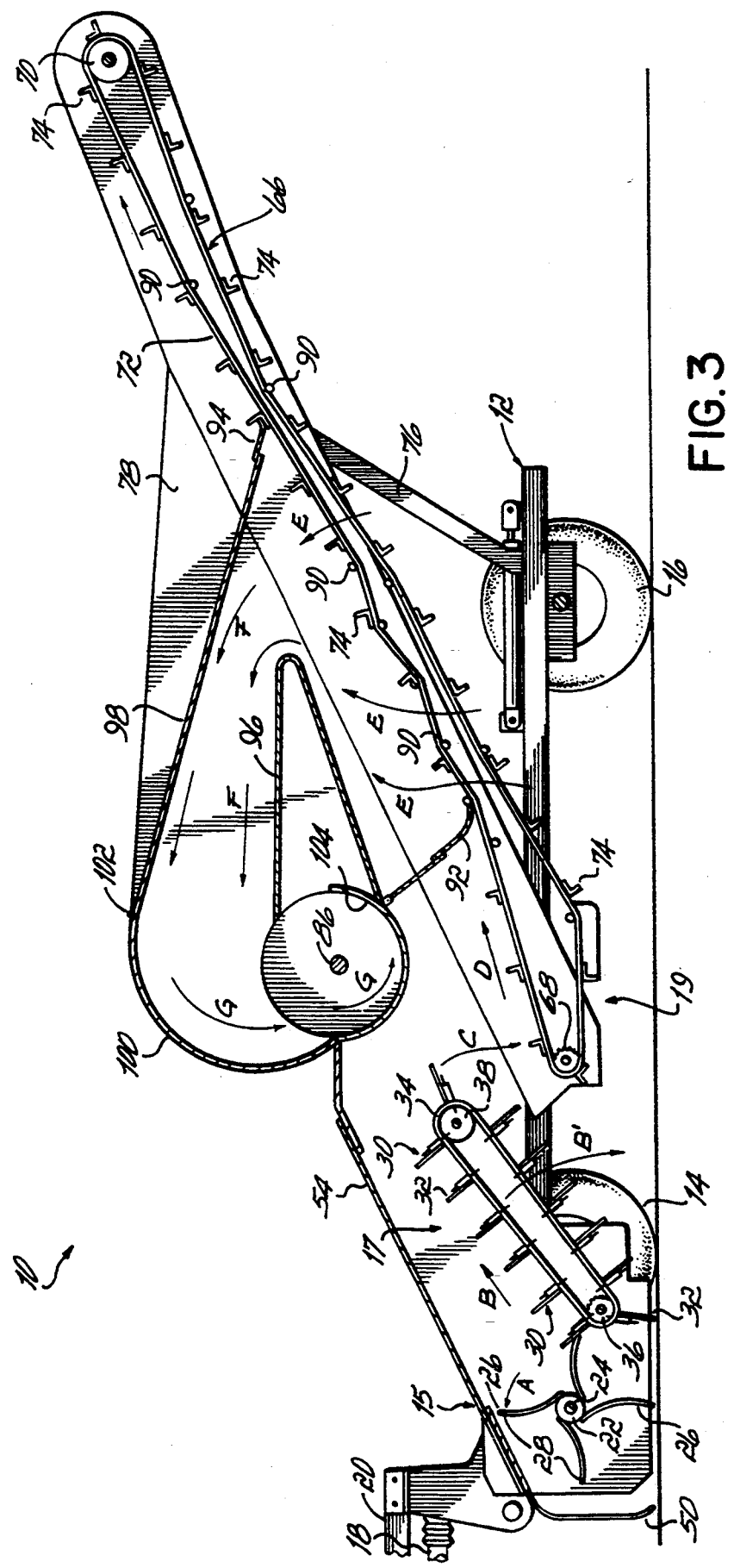
FIG. 3 is a cross-sectional view taken along line 3—3 of FIG. 2.

The nut harvester 10 as shown in FIGS. 1-3 of this invention, includes three primary sections: a pick-up section 15, a grid section 17, and a conveyor/fan section 19. These three primary sections are aligned longitudinally on the nut harvester 10 in the fore to aft direction. The following description of this invention will proceed sequentially with reference to each of these sections.

The pick-up section 15 is positioned in the leading portion of the nut harvester 10 just below and aft of the hitch 20 and power take-off 18 as shown in FIGS. 1-3. A feed reel 22 rotates on a shaft 24 in the direction of arrow A as shown in FIG. 3 and includes a number of radially extending flights 26 of prongs 28. The prongs 28 are preferably rubber, and during rotation approach the ground level. For optimal effectiveness, the prongs 28 include a rearwardly bowed curvature for sweeping the ground.

The pick-up section 15 also includes a number of wipers 30 which move in a generally oval path and include projecting finger assemblies 32. The wipers 30 are preferably spaced approximately 6½ inches from one another and extend transversely across the nut harvester 10 and are designed to be approximately the width of the windrow. The wipers 30 are interconnected by a pair of laterally spaced chains 34 (only one shown) which advance the wipers 30 in the oval path around a forward sprocket 36 and a rear pulley 38 as shown in FIG. 3. The sprocket 36 is rotationally driven to move the wipers 30 in the oval path in the direction of arrow B. The oval path of the wipers 30 is inclined with respect to the ground such that the sprocket 36 at the leading end of the path is positioned below the pulley 38 at the trailing end.

As each wiper 30 successively approaches the sprocket 36 at the leading end of the lower portion of their oval path, the outwardly projecting finger assembly 32 secured to the wiper 30 approaches the ground. The finger assembly 32 sweeps along the ground to propel the nuts and debris forward and upward into the rotating feed reel 22. The finger assemblies 32 propel the nuts and debris forward against the rotating flights 26 of prongs 28 on the feed reel 22, which in turn lift and then propel the nuts upwardly and rearwardly back onto the wipers 30 as they move in the upper portion of their oval path.

Figure 5:
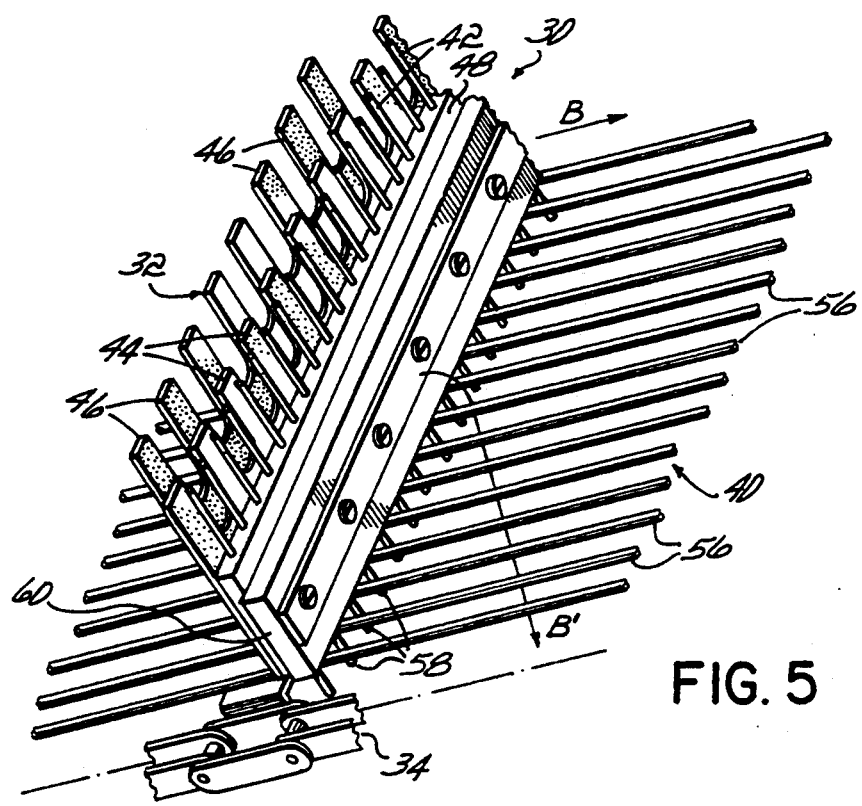
FIG. 5 is a partial perspective view of a wiper and a stationery grid of this invention.
Figure 7:
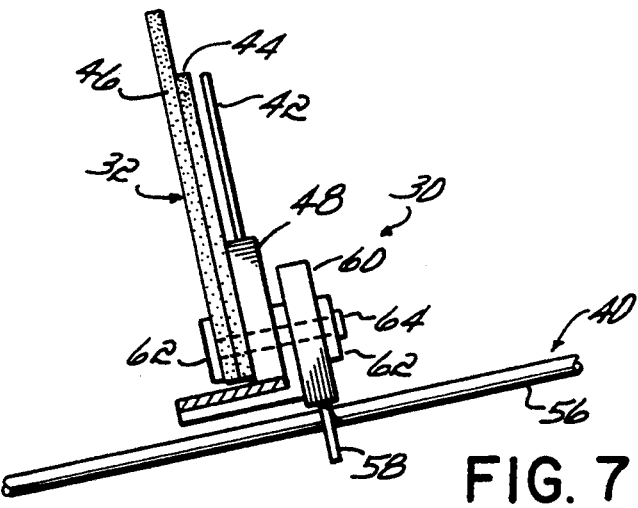
FIG. 7 is a side elevational sectioned view of the wiper and stationary grid.
Figure 6:
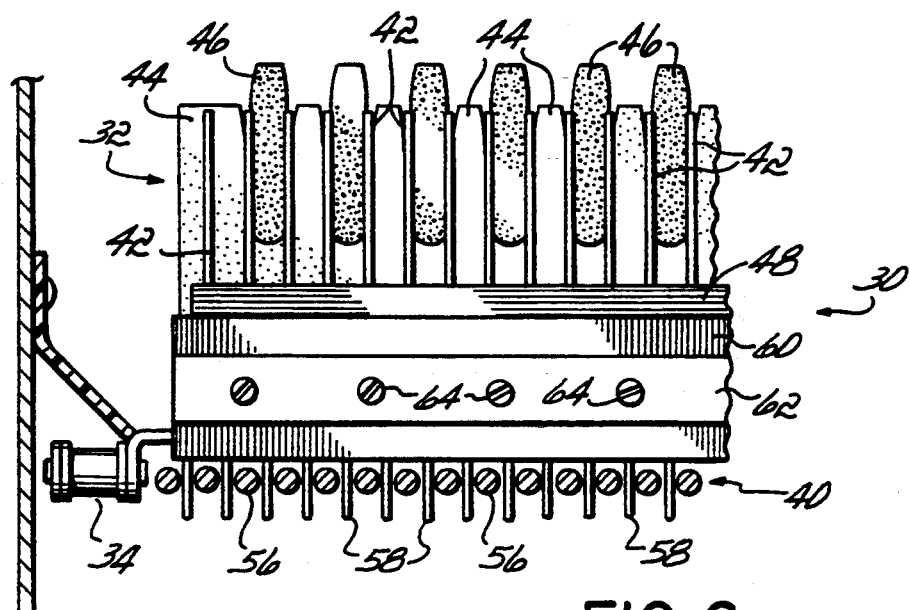
FIG. 6 is a front elevational sectioned view of the wiper and stationary grid of FIG. 5.

The wiper 30 of this invention is shown in FIGS. 5-7 in combination with a stationary grid 40 which will be described in connection with the grid section 17 of the nut harvester 10. Each wiper 30 is coupled to the chain 34 as shown in FIG. 5 on the lateral side of the wiper 30 and grid 40. The finger assembly 32 of this invention preferably includes a row of leading fingers 42, intermediate fingers 44, and trailing fingers 46. The leading fingers 42 are secured to the wiper 30 by a block mount 48 and are preferably constructed of metal to form a metal rake-like section at the leading edge of the finger assembly 32. The spacing between adjustment metal fingers 42 is designed to gather the nuts therein from the windrow and thereby propel them upwardly and forwardly into the feed reel 22.

The intermediate 44 and trailing 46 fingers are constructed of preferably hard rubber or plastic and are intended to sweep the ground after the metal fingers 42 have collected the nuts to gather any nuts which may have been missed. The intermediate 44 and trailing 46 fingers are preferably staggered with respect to each other for more complete ground coverage and are each generally rectangular in cross-section as shown in FIGS. 5-7.

The pick-up section 15 is enclosed on the leading end of the nut harvester 10 by a protective flap 50 having multiple generally parallel slits 52 cut therein as shown in FIG. 1. The flap 50 is preferably fabricated of hard rubber and includes the multiple slits 52 to accommodate the varying terrain and profile of the windrows passing under the flap 50. A sloped panel 54 encloses both the pick-up section 15 and grid section 17 on the top side of the nut harvester 10.

After the mixture of nuts and debris are swept from the ground by the finger assemblies 32 into the feed reel 22 and then returned to the upper path of the wipers 30, the grid section 17 removes the dirt clumps and any sand-like soil from the mixture. The grid 40, as shown in FIGS. 5-7, underlies the wipers 30 in the upper portion of the oval path as shown in FIG. 3. The grid 40 is constructed of a plurality of longitudinally extending, generally parallel bars 56 of preferably 0.5 inch outer diameters. The bars 56 have an elongated center section with a downwardly curled section at each end to conform to the rounded ends of the wipers' 30 oval path.

The spacing between the bars 56 is designed to accommodate the particular nuts being harvested and to prevent the nuts from falling through the grid 40 between adjacent bars 56. For example, the spacing between the bars 56 would preferably be about $\frac{1}{4}$ inch for the harvesting of almonds and approximately $\frac{3}{4}$ inch for walnuts, pecans, and other large nuts.

The grid 40 is inclined having a leading end lower than a trailing end. The mixture of nuts and debris are deposited on the grid 40 by the feed reel 22 and advanced upwardly along the grid 40 by the wipers 30 extending transversely across the grid 40 and moving in the upper portion of their path as in the direction of arrow A in FIG. 3.

Each wiper 30 includes a plurality of teeth 58, preferably metallic, which project from a mounting block 60 downwardly into the grid 40 between the spaced bars 56 as shown in FIGS. 5-7. Alternatively, the teeth 58 and the leading fingers 42 may project from opposing ends of the same mounting block (not shown), to thereby eliminate either mounting block 48 or 60.

The wiper 30 is secured in a sandwich configuration by joining the teeth mounting block 60, the metal finger mounting block 48 and the intermediate and trailing fingers 44, 46 with a pair of wiper brackets 62 secured with screws 64 or other fasteners.

The teeth 58 advantageously project through the grid 40 to extend below the underneath surface of the bars 56. A single tooth 58 is positioned between each pair of adjacent bars 56 so that the dirt clumps, sand-like soil or other large debris collected with the nuts can be forced between the bars 56 while the nuts and remaining debris move upwardly across the top surface of the grid 40 with the advancement of the wipers 30. The dirt and sand-like soil, after passing through the grid 40, falls directly to the ground therebelow as shown by arrow B' in FIG. 3. In that the dirt and sand-like soil is returned to the ground directly without the benefit of a large fan or forceful air stream, dust emissions generated by the dirt and sand-like soil are minimized in the nut harvester 10 of this invention.

After the mixture of nuts and remaining debris advance by the wipers 30 to the uppermost trailing end of the grid 40, they fall in the direction of arrow C in FIG. 3 onto an elongated perforate conveyor 66 thereby entering the conveyor/fan section 19 of the nut harvester 10. The conveyor 66 moves in a path between a leading sprocket 68 and a trailing elevated pulley 70 such that an upper run 72 of the conveyor 66 moves in the direction of arrow D toward the trailing end of the nut harvester 10. A number of angle irons 74, preferably spaced 13 inches apart, extend transversely on the conveyor 66 to retain the nuts and debris moving on the upper run 72. The conveyor 66 is perforated and preferably constructed of a metallic mesh to which the angle irons 74 are secured as shown in FIG. 1. The trailing end of the conveyor 66 is elevated and supported on the frame 12 of the nut harvester 10 by an angled conveyor support 76 and a pair of conveyor side panels 78 on each lateral side thereof.

A centrifugal fan 80 having radially extending fan blades 82 is positioned within a fan housing 84 on a lateral side of the nut harvester 10 as shown in FIGS. 1 and 2. The centrifugal fan 80 rotates on a drive shaft 86 which extends the width of the nut harvester 10 and is coupled to the power take off 18 by a driving mechanism (not shown) located on the opposite lateral side of the nut harvester 10.

In operation, the centrifugal fan 80 draws air from below the perforate conveyor 66 and into the nut harvester 10 as shown by arrows E in FIG. 3. The suction of air through the perforate conveyor 66 by the fan 80 generates an upwardly directed air stream through the conveyor 66 and the mixture of nuts and debris traveling on the upper run 72 thereof. The air stream flowing through the mixture separates the debris from the nuts as the debris is entrained within the air stream and the heavier nuts, which are not caught in the air stream, continue on the upper run 72 of the conveyor 66. To assist the separation of the debris from the nuts, a series of undulations are created in the upper run 72 of the conveyor 66 by a number of staggered guide bearings 90 which direct the path of the upper run 72 as shown in FIG. 3. The guide bearings 90 do not extend the entire width of the conveyor 66 and therefore could be positioned both on top of and below the upper run 72 without interfering with the movement of the conveyor 66 and nuts.

A forward and rear adjustable flap door 92, 94 are provided to isolate the air intake from both the front and rear ends of the conveyor 66 and to direct the air stream therebetween. The adjustable flap doors 92, 94 are preferably constructed of a hard rubber material to accommodate the varying profile of the upper run 72, nuts, and debris without sacrificing the isolation of air intake for the centrifugal fan 80.

The nuts pass under the rear adjustable flap door 94 and continue to travel on the upper run 72 of the conveyor 66 and are deposited into a collection bin or hopper (not shown) as the conveyor 66 travels around the upper pulley 70.

The air stream and debris entrained therein is directed upwardly and rearwardly around a stationary shroud 96 as shown in FIGS. 1-3. At the upper portion of the nut harvester 10, the rear adjustable flap door 94 is secured to a panel 98 which is hinged to an arcuate cover 100. A hinge 102 is provided to lift the panel 98 and door 94 for access to the interior of the nut harvester 10. The panel 98 and arcuate cover 100 cooperate with the stationary shroud 96 to define an airflow channel to the air stream advances in the direction of arrows F and G in FIG. 3. The air stream and entrained debris are directed into a semi-circular, upwardly open trough 104 which provides access to the centrifugal fan 80 through a collar 106 as shown in FIG. 1. The collar 106 and trough 104 are interconnected to direct the air stream laterally toward the side of the nut harvester 10 and into the fan housing 84. The fan drive shaft 86 extends through the collar 106 and the upwardly open trough 104.

Figure 4:
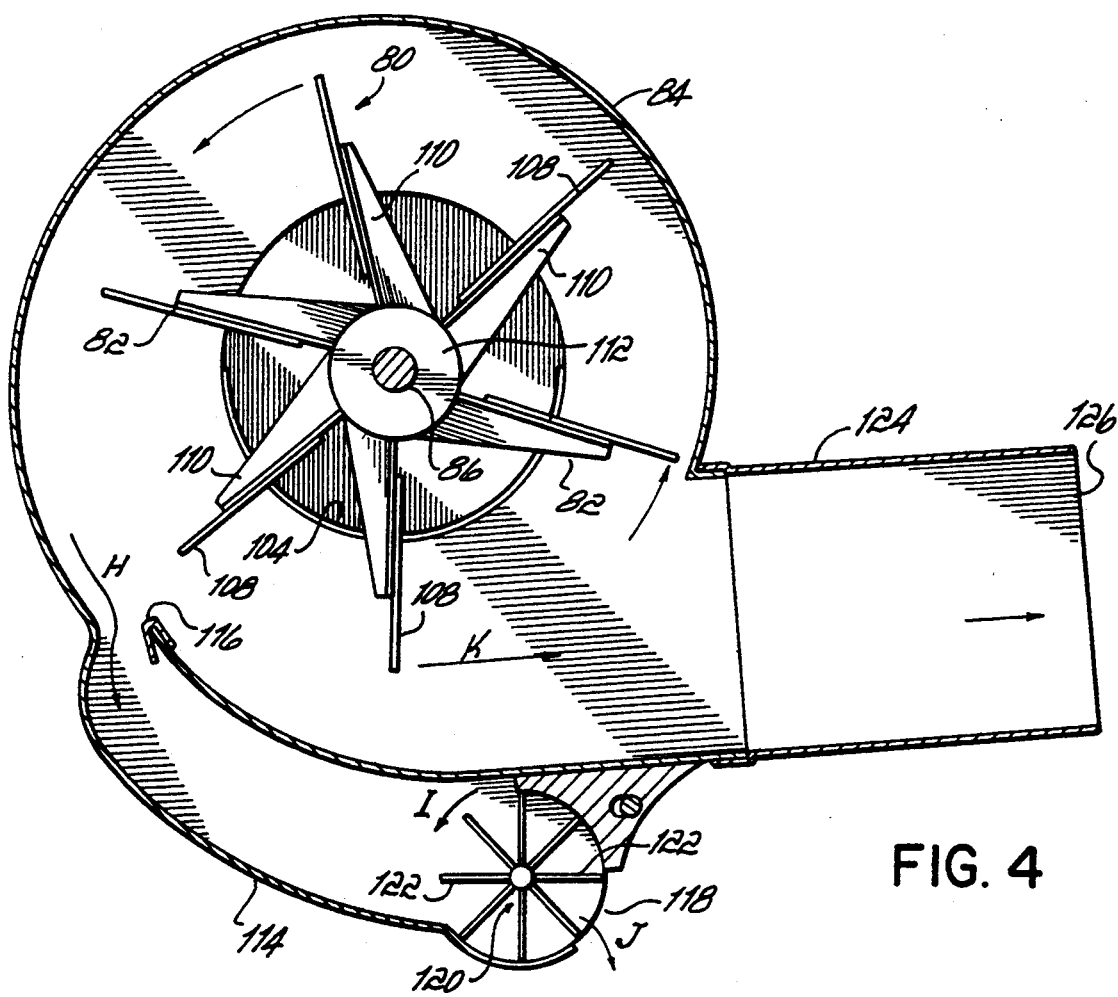
FIG. 4 is a cross-sectional view taken along line 4—4 of FIG. 2.

The fan blades 82 rotate within the generally circular fan housing 84 and thereby circulate the air stream and debris within the fan housing 84 as shown by FIG. 4. Each fan blade 82 includes a generally planar face 108 secured to a radially extending post 110 projecting from a bushing 112 mounted on the drive shaft 86. The centrifugal fan 80 preferably rotates in the range of 800 to 1,000 RPM depending upon the nut to be harvested and the moisture content of the mixture of nuts and debris. The resulting air stream flow is preferably 10,000–11,000 cubic feet per minute.

A scoop section 114 is connected to the forward lower portion of the fan housing 84. As the debris circulates within the fan housing 84 with the rotation of the fan blades 82, the centrifugal force of the rotating debris moves the heavier debris toward the outermost regions of the fan blades 82 proximate the fan housing 84. The heavier debris will typically consist of twigs, larger leaves, and any remaining dirt. As the heavier debris circulates in the perimeter of the fan housing 84, the scoop section 114 shears it off from the air stream. An entrance 116 to the scoop section 114 is formed to direct the heavier debris therein as shown by arrow H in FIG. 4. The fan 80 is eccentrically mounted within the fan housing 84 so that the clearance between the fan blades 82 and the housing 84 is greater proximate the scoop section 114 than diametrically opposite the scoop section 114.

At a terminal end of the scoop section 114 a discharge port 118 deposits heavier debris which accumulates within the scoop section 114 directly to the ground below as shown in FIG. 1. Positioned at the discharge port 118 in the scoop section 114 is a rotating air-lock 120 having a number of air-lock blades 122. The air-lock 120 rotates in the direction of arrow I (FIG. 4), preferably in the range of 60 to 70 RPM, to minimize the flow of air passing through the air-lock 120 and the scoop section 114.

The air-lock blades 122 are preferably rubber or a like synthetic material and sweep the heavier debris in the scoop section 114 out through the discharge port 118. The air-lock 120 minimizes the flow of air through the scoop section 114 thereby creating an eddy current (arrow J in FIG. 4) near the entrance 116 of the scoop section 114 to enhance the separation of the heavier debris from the airflow within the fan housing 84.

The lighter debris circulates within the fan housing 84 with the rotation of the fan blades 82, but due to its lesser weight the centrifugal force is less in comparison to the heavier debris. Therefore, the lighter debris remains at the central or middle regions of the fan housing 84 and by-passes the scoop section 114 and is discharged from the fan housing 84 through a discharge conduit 124 to a discharge port 126 as shown in arrow K in FIG. 4. The lighter debris, typically consisting of grasses and smaller leaves is returned to the atmosphere in the air stream through the discharge port 126 as shown in FIG. 1.

As a result of the nut harvester 10 of this invention, the debris collected with the nuts is returned directly to the ground both through the stationary grid 40 and the scoop section 114 and air-lock 120 combination to thereby minimize the dust emissions and airborne pollutants generated by the nut harvester 10. The only debris returned to the atmosphere through the air stream generated by the centrifugal fan 80 is the lighter debris which exiting the discharge port 126.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims.

We claim:

1. An apparatus for harvesting nuts located on the ground and for separating debris collected therewith, the apparatus comprising:
   a perforate conveyor having an upper run moving in a first direction, the collected debris and nuts being positioned atop said conveyor on said upper run;
   a fan having a plurality of radially extending and rotating fan blades, said fan also having a first and second discharge port;
   an airflow channel directing a stream of air generated by said fan upwardly through said upper run to thereby separate the debris from the nuts, the nuts returning by gravity to the upper run for continued movement thereon and the debris being entrained within said air stream; and
   a debris partitioning device to separate the debris being airborne within said air stream into lighter debris and heavier debris, said partitioning device comprising a generally circular fan housing in which said fan blades rotate to thereby generate said air stream and a circulator for said lighter and heavier debris within said fan housing to intermingle said lighter and heavier debris with said fan blades, said heavier debris being forced toward an outer radial region of said fan blades and away from a center of said fan due to centrifugal forces of the rotation of said heavier debris within said fan housing, said lighter debris being maintained more radially inward on said fan blades in comparison to said heavier debris due to less centrifugal force being associated with said lighter debris, said air stream carrying said lighter debris through said partitioning device and out of the nut harvesting apparatus and to the atmosphere through said first discharge port, said air stream carrying said heavier debris through said partitioning device and out through said second discharge port for return to the ground.

2. The apparatus of claim 1 wherein said partitioning device comprises a scoop section connected to said fan housing for receiving therein said heavier debris, said scoop section including said second discharge port for deposition of said heavier debris onto the ground therebelow, said fan housing also being connected to a discharge conduit for receiving therein said lighter debris after said heavier debris has entered said scoop section, said discharge conduit including said first discharge port for release of said lighter debris to the atmosphere.

3. The apparatus of claim 2 further comprising:
   an air-lock positioned within a terminal end of said scoop section, said air-lock receiving said heavier debris for deposition through said second discharge port onto the ground therebelow without permitting a significant portion of said air stream to enter said scoop section and pass through said second discharge port, said scoop section and said air-lock cooperating to generate an eddy current of air within said scoop section to aid in the separation of said heavier debris from said air stream.

4. The apparatus of claim 3 wherein said air-lock comprises a plurality of rotating air-lock blades to thereby sequentially seal said second discharge port and minimize airflow through said air-lock.

5. The apparatus of claim 2 wherein said fan housing is primarily circular with the exception of regions interconnecting said discharge conduit and said scoop section to said fan housing, said fan being eccentrically mounted within said primarily circular fan housing such that a tip of each said fan blade during the rotation of said fan is spaced further from said housing proximate said scoop section than when said fan blade tip is diametrically opposite said scoop section, said fan being eccentrically mounted within said fan housing in order to assist said heavier debris in entering said scoop section and in separating from said light debris and assist said lighter debris in entering said discharge conduit.

6. The apparatus of claim 1 wherein said upper run of said conveyor includes a series of undulations to enhance the separation of the nuts from the debris in said air stream.

7. The apparatus of claim 1 wherein said fan is positioned laterally with respect to said conveyor, said upper run of said conveyor being interconnected with said fan by an upwardly open semi-circular trough to thereby provide a path to said fan for said air stream and the debris entrained therein.

8. An apparatus for harvesting nuts located on the ground and for separating debris collected therewith, the apparatus comprising:
a grid having a plurality of generally parallel spaced bars and defining a plane, the nuts and debris being deposited atop said grid, said bars being spaced to prevent the nuts from passing therebetween;
a plurality of wipers extending transversely across said grid generally perpendicular to said bars, each said wiper having a plurality of teeth which project into said grid, between said bars and intersect said grid plane, and a translator to move said wipers across said grid to thereby advance the nuts atop said grid and force the debris through said grid and between said bars for return to the ground to thereby separate the nuts from the debris returned to the ground.

9. The apparatus of claim 8 wherein said teeth project downwardly through said grid as said wipers move in a path, an upper portion of said path advancing said wipers over said grid and projecting said teeth downwardly through said bars, a lower portion of said path being in close proximity to the ground, said wipers having finger assemblies projecting oppositely from said teeth, said finger assemblies engaging the ground during said lower portion of said path to thereby propel the nuts and debris forwardly and upwardly into a feed reel positioned in advance of said grid, said feed reel having a plurality of radially extending and rotating flights of prongs onto which the nuts and debris are propelled by said ground engaging finger assemblies, said feed reel depositing the nuts and debris onto said grid, the combination of said finger assemblies and said feed reel cooperating to minimize the amount of debris collected with the nuts.

10. The apparatus of claim 8 wherein said grid is inclined with respect to the ground such that a leading end of said grid is positioned below a trailing end of said grid.

11. The apparatus of claim 9 wherein the rotation of said flights of said prongs and the travel of said wipers are sequentially timed so as to interject one of said flights of prongs between said ground engaging finger assemblies of adjacent wipers.

12. The apparatus of claim 9 wherein said ground engaging finger assemblies comprise a leading, an intermediate and a trailing section, each said section extending transversely across said grid and having a plurality of generally parallel similarly oriented spaced fingers.

13. The apparatus of claim 12 wherein said fingers of said leading section are fabricated of metal and said fingers of each said intermediate and trailing sections are fabricated from one of a set of materials comprising rubber and polyurethane.

14. The apparatus of claim 8 wherein said grid is fixed with respect to the nut harvesting apparatus.

15. An apparatus for harvesting nuts located on the ground and for separating debris collected therewith, the apparatus comprising:
a plurality of wipers extending transversely with respect to the direction of movement of the nut harvesting apparatus, each said wiper including a plurality of ground engaging finger assemblies, said wipers moving in a path, a lower portion of said path being in close proximity to the ground enabling said finger assemblies to engage the ground and thereby propel the nuts and debris forwardly and upwardly into a feed reel positioned in advance of said path of said wipers;
said feed reel having a plurality of radially extending and rotating flights of prongs onto which the nuts and debris are propelled, said feed reel rotating in a direction opposite to the movement of said wipers, said feed reel in turn depositing the nuts and debris onto an upper portion of said path of said wipers;
a grid having a plurality of generally parallel spaced bars and defining a plane, the nuts and debris being deposited atop said grid by said feed reel, said grid being positioned below said upper path of said wipers, said bars being spaced to prevent the nuts from passing therebetween, said wipers extending transversely across said grid generally perpendicular to said bars;
a plurality of teeth on each said wiper which project into said grid, between said bars and intersect said grid plane, a translator to move said wipers across said grid in said upper portion of said path to thereby advance the nuts atop said grid and force a portion of the debris through said grid and between said bars for return to the ground to thereby separate the nuts from said portion of debris returned to the ground;
a perforate conveyor having an upper run moving in a first direction generally parallel with the direction of movement of the nut harvesting apparatus, the nuts being deposited atop said conveyor on said upper run by said wipers;
a fan having a plurality of radially extending and rotating fan blades, said fan rotating within a generally circular housing and also having a first and second discharge port;
an airflow channel directing a stream of air generated by said fan upwardly through said upper run to thereby separate the debris from the nuts, the nuts returning by gravity to the upper run for continued movement thereon and the debris being entrained within said air stream;
a debris partitioning device to separate the debris being airborne within said air stream into lighter debris and heavier debris, said partitioning device comprising a circular to intermingle the debris with the fan in said fan housing, said air stream carrying said lighter debris through said partitioning device and out of the nut harvesting apparatus and to the atmosphere through said first discharge port, said air stream carrying said heavier debris through said partitioning device and out through said second discharge port for return to the ground; and a bin for collecting the nuts deposited therein by said upper run of said conveyor.

16. The apparatus of claim 15 wherein said partitioning device comprises a fan housing in which said fan blades rotate to thereby generate said air stream, said lighter and heavier debris circulating within said fan housing with said fan blades, said heavier debris being forced toward an outer radial region of said fan blades and away from a center of said fan due to the centrifugal forces of the rotation of said heavier debris within said fan housing, said lighter debris being maintained more radially inward on said fan blades in comparison to said heavier debris due to less centrifugal force being associated with said lighter debris, a scoop section connected to said fan housing for receiving therein said heavier debris, said scoop section including said second discharge port for deposition of said heavier debris onto the ground therebelow, said fan housing also being connected to a discharge conduit for receiving therein said lighter debris after said heavier debris has entered said scoop section, said discharge conduit including said first discharge port for release of said lighter debris to the atmosphere.

17. The apparatus of claim 16 further comprising:
an air-lock positioned within a terminal end of said scoop section, said air-lock receiving said heavier debris for deposition through said second discharge port onto the ground therebelow without permitting significant airflow through said air-lock, said scoop section and said air-lock cooperating to generate an eddy current of air within said scoop section to aid in the separation of said heavier debris from said air stream.

18. The apparatus of claim 17 wherein said air-lock comprises a plurality of rotating air-lock blades to thereby sequentially seal said second discharge port and minimize airflow through said air-lock.

19. The apparatus of claim 16 wherein said fan housing is primarily circular with the exception of regions interconnecting said discharge conduit and said scoop section to said fan housing, said fan being eccentrically mounted within said primarily circular fan housing such that a tip of each said fan blade during the rotation of said fan is spaced further from said housing proximate said scoop section than when said fan blade tip is diametrically opposite said scoop section, said fan being eccentrically mounted within said fan housing in order to assist said heavier debris in entering said scoop section and in separating from said light debris and assist said lighter debris in entering said discharge conduit.

20. The apparatus of claim 15 wherein said upper run of said conveyor includes a series of undulations to enhance the separation of the nuts from the debris in said air stream.

21. The apparatus of claim 15 wherein said fan is positioned laterally with respect to said conveyor, said upper run of said conveyor being interconnected with said fan by an upwardly open semi-circular trough to thereby provide a path to said fan for said air stream and the debris entrained therein.

22. The apparatus of claim 15 wherein said teeth project downwardly through said grid as said wipers move in a path, an upper portion of said path advancing said wipers over said grid and projecting said teeth downwardly through said bars, a lower portion of said path being in close proximity to the ground, said wipers having finger assemblies projecting oppositely from said teeth, said finger assemblies engaging the ground during said lower portion of said path to thereby propel the nuts and debris forwardly and upwardly into a feed reel positioned in advance of said grid, said feed reel having a plurality of radially extending and rotating flights of prongs onto which the nuts and debris are propelled by said ground engaging finger assemblies, said feed reel depositing the nuts and debris onto said grid, the combination of said finger assemblies and said feed reel cooperating to minimize the amount of debris collected with the nuts.

23. The apparatus of claim 15 wherein said grid is inclined with respect to the ground such that a leading end of said grid is positioned below a trailing end.

24. The apparatus of claim 22 wherein the rotation of said flights of prongs and the travel of said wipers are sequentially timed so as to interject one of said flights of prongs between said ground engaging finger assemblies of adjacent wipers.

25. The apparatus of claim 22 wherein said ground engaging finger assemblies comprise a leading, an intermediate and a trailing section, each said section extending transversely across said grid and having a plurality of generally parallel similarly oriented spaced fingers.

26. The apparatus of claim 25 wherein said fingers of said leading section are fabricated of metal and said fingers of each said intermediate and trailing sections are fabricated from one of a set of materials comprising rubber and polyurethane.

27. The apparatus of claim 15 wherein said grid is fixed with respect to the nut harvesting apparatus.

28. A method for harvesting nuts located on the ground and for separating debris collected therewith, the method comprising:
moving an upper run of a perforate conveyor in a first direction;
depositing the collected nuts and debris atop said upper run of said conveyor;
generating an air stream with a rotating fan;
directing said air stream upwardly through the nuts and debris on said upper run to thereby uplift and separate the debris from the nuts;
entraining the debris within said air stream;
circulating the debris within said rotating fan;
partitioning the debris within said air stream into lighter debris and heavier debris;
discharging said lighter debris to the atmosphere; and
depositing said heavier debris onto the ground.

29. A method for harvesting nuts located on the ground and for separating debris collected therewith, the method comprising:
depositing the collected nuts and debris atop a stationary grid having a plurality of generally parallel spaced bars, said bars being spaced to prevent the nuts from passing therebetween;
advancing a plurality of wipers longitudinally across said grid, said wipers extending transversely across said grid, each said wiper having a plurality of teeth projecting into said grid and between said bars;
forcing the debris through said grid and between said bars with said teeth as said wipers advance across said grid; and retaining the nuts atop said grid to thereby separate the nuts from the debris.

30. A method for harvesting nuts located on the ground and for separating debris collected therewith, the method comprising:

sweeping the ground with a plurality of ground engaging finger assemblies, said finger assemblies engaging the ground and the nuts and debris located thereon;

propelling the nuts and debris forwardly and upwardly from the ground and into a feed reel positioned in advance of said finger assemblies;

rotating said feed reel such that radially extending flights on said feed reel retain the nuts and debris propelled thereon;

depositing the nuts and debris from said feed reel onto a stationary grid having a plurality of generally parallel spaced bars, said bars being spaced to prevent the nuts from passing therebetween;

advancing a plurality of wipers longitudinally across said grid, said wipers extending transversely across said grid, each said wiper having a plurality of teeth projecting into said grid and between said bars;

forcing the debris through said grid and between said bars with said teeth as said wipers advance across said grid;

retaining the nuts atop said grid to thereby separate the nuts from the debris;

moving an upper run of a perforate conveyor in a first direction;

depositing the nuts and remaining debris atop said upper run of said conveyor;

generating an air stream with a rotating fan;

directing said air stream upwardly through the nuts and remaining debris on said upper run to thereby uplift and separate the debris from the nuts;

entraining the debris within said air stream;

circulating the debris within said rotating fan;

partitioning the debris within said air stream into lighter debris and heavier debris;

discharging said lighter debris to the atmosphere; and depositing said heavier debris onto the ground.

* * * * *